(12) United States Patent
Strömberg et al.

(10) Patent No.: US 11,232,660 B2
(45) Date of Patent: Jan. 25, 2022

(54) USING A PRIVATE KEY OF A CRYPTOGRAPHIC KEY PAIR ACCESSIBLE TO A SERVICE PROVIDER DEVICE

(71) Applicant: ASSA ABLOY AB, Stockholm (SE)

(72) Inventors: Stefan Strömberg, Stockholm (SE); Sona Singh, Täby (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/982,930

(22) PCT Filed: Apr. 11, 2019

(86) PCT No.: PCT/SE2019/050334
§ 371 (c)(1),
(2) Date: Sep. 21, 2020

(87) PCT Pub. No.: WO2019/199225
PCT Pub. Date: Oct. 17, 2019

(65) Prior Publication Data
US 2021/0019968 A1   Jan. 21, 2021

(30) Foreign Application Priority Data
Apr. 11, 2018   (EP) ..................................... 8166789

(51) Int. Cl.
*G07C 9/00*   (2020.01)
*H04L 29/06*   (2006.01)

(52) U.S. Cl.
CPC ..... *G07C 9/00571* (2013.01); *G07C 9/00309* (2013.01); *G07C 9/00857* (2013.01);
(Continued)

(58) Field of Classification Search
CPC ............ G07C 9/00571; G07C 9/00309; G07C 9/00857; G07C 2009/00865;
(Continued)

(56) References Cited

U.S. PATENT DOCUMENTS 8,274,365 B2 * 9/2012 Piccirillo ................ E05B 41/00
                                                        340/5.6
8,482,378 B2 * 7/2013 Sadighi .............. G07C 9/00571
                                                        340/5.2
(Continued)

FOREIGN PATENT DOCUMENTS

DE         10147936         4/2003
EP          3291182         3/2018
(Continued)

OTHER PUBLICATIONS

Extended Search Report for European Patent Application No. 18166789.0, dated Oct. 1, 2018, 7 pages.
(Continued)

*Primary Examiner* — Nam V Nguyen
(74) *Attorney, Agent, or Firm* — Sheridan Ross P.C.

(57) ABSTRACT

It is provided a method for providing access to a physical space secured by a lock for provision of a service. The method comprises the steps of: receiving an approval signal from a service consumer device of the service consumer, the approval signal indicating that the service consumer allows a service provider agent of a service provider to open the lock; receiving, from the service provider device, a request to assign a service provider agent to open the lock; communicating with the service provider device to use a private key of a cryptographic key pair accessible to the service provider device, the private key being used to generate service agent access data that is specific for the service provider agent, to allow the service provider agent to open the lock; and transmitting the service agent access data to a service provider agent device associated with the service provider agent.

11 Claims, 3 Drawing Sheets

(52) U.S. Cl.
CPC ........ *H04L 63/0442* (2013.01); *H04L 63/123* (2013.01); *G07C 2009/00865* (2013.01); *G07C 2209/02* (2013.01); *G07C 2209/04* (2013.01)

(58) Field of Classification Search
CPC ............ G07C 2209/02; G07C 2209/04; H04L 63/0442; H04L 63/123
USPC .................................................. 340/5.61, 5.7
See application file for complete search history.

(56) References Cited

U.S. PATENT DOCUMENTS

| | | | |
|---|---|---|---|
| 9,449,449 B2* | 9/2016 | Evans ................. | H04W 12/082 |
| 9,607,458 B1 | 3/2017 | Schleiff | |
| 9,640,002 B1* | 5/2017 | Grasberg ........... | G07C 9/00571 |
| 9,824,193 B2* | 11/2017 | Ganapathy Achari | .... H04L 9/00 |
| 9,892,584 B1* | 2/2018 | Saylor ..................... | E05B 45/06 |
| 10,136,313 B2* | 11/2018 | Minichmayr ....... | G07C 9/00571 |
| 10,171,974 B2* | 1/2019 | Ahearn .............. | G07C 9/00571 |
| 10,229,548 B2* | 3/2019 | Daniel-Wayman | .......................... G07C 9/00309 |
| 10,676,066 B2* | 6/2020 | Liu .......................... | B60R 25/20 |
| 10,820,198 B2* | 10/2020 | Ozzie ................. | H04W 12/06 |
| 10,979,437 B2* | 4/2021 | Gideon, III ............. | H04L 63/06 |
| 2001/0050615 A1 | 12/2001 | Kucharczyk et al. | |
| 2003/0151493 A1* | 8/2003 | Straumann ......... | G07C 9/00857 340/5.25 |
| 2006/0170533 A1* | 8/2006 | Chioiu .................... | G07C 9/27 340/5.61 |
| 2008/0211620 A1* | 9/2008 | Willgert ................... | G07C 9/38 340/5.2 |
| 2010/0097174 A1 | 4/2010 | Marmigere et al. | |
| 2010/0223170 A1 | 9/2010 | Bahar | |
| 2014/0361866 A1 | 12/2014 | Evans et al. | |
| 2015/0221152 A1* | 8/2015 | Andersen ................. | G07C 9/21 340/5.22 |
| 2017/0154483 A1* | 6/2017 | Cordiner ................ | G05B 19/00 |
| 2017/0249794 A1 | 8/2017 | Davis | |
| 2017/0337755 A1 | 11/2017 | Biehl et al. | |
| 2017/0352215 A1* | 12/2017 | Maiwand ........... | G07C 9/00309 |
| 2018/0248704 A1* | 8/2018 | Coode .................... | H04L 9/3268 |
| 2018/0351941 A1 | 12/2018 | Chhabra | |

FOREIGN PATENT DOCUMENTS

| | | |
|---|---|---|
| WO | WO 2008/076074 | 6/2008 |
| WO | WO 2016/166362 | 10/2016 |
| WO | WO 2018/104383 | 6/2018 |
| WO | WO 2018/104384 | 6/2018 |

OTHER PUBLICATIONS

International Search Report and Written Opinion for International (PCT) Patent Application No. PCT/SE2019/050334, dated Aug. 8, 2019, 13 pages.
Extended Search Report for European Patent Application No. 21174065.9, dated Aug. 30, 2021, 7 pages.
Official Action with English Translation for China Patent Application No. 201980024723.6, dated Oct. 9, 2021, 22 pages.

* cited by examiner

USING A PRIVATE KEY OF A CRYPTOGRAPHIC KEY PAIR ACCESSIBLE TO A SERVICE PROVIDER DEVICE

CROSS REFERENCE To RELATED APPLICATIONS

This application is a national stage application under 35 U.S.C. 371 and claims the benefit of PCT Application No. PCT/SE2019/050334 having an international filing date of Apr. 11, 2019, which designated the United States, which PCT application claimed the benefit of European Patent Application No. 18166789.0 filed Apr. 11, 2018, the disclosure of each of which are incorporated herein by reference.

TECHNICAL FIELD

The invention relates to a method, an access co-ordinator, a computer program and a computer program product for providing access to a physical space secured by a lock. Specifically, a private key of a cryptographic key pair accessible to a service provider device is used in conjunction to when an access right is assigned to a service provider agent.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

When an owner or user of such an electronic lock consumes a service, that person is here denoted a service consumer. The service can be any service where the person performing the service needs the electronic lock to be opened. For instance, the service can be a delivery of a product, a cleaning service, a builder/plumber/electrician, etc. To be able to consume the service, the service consumer thus needs to provide access to a service provider using the electronic lock.

When such access is granted by the service consumer, the communication of access rights can be provided using an access coordinator. However, it is of great importance that such access rights are communicated securely in order not to compromise on security.

EP 3 291 182 A1 discloses a sequence of delegations for controlling access to a physical space.

SUMMARY

It is an object to provide a way of co-ordinating the communication of access rights where an attack is very unlikely to result in any exposed access rights.

According to a first aspect, it is provided a method for providing access to a physical space, secured by a lock, for provision of a service, the lock being associated with a service consumer. The method is performed in an access coordinator and comprises the steps of: receiving an approval signal from a service consumer device of the service consumer, the approval signal indicating that the service consumer allows a service provider agent of a service provider to open the lock; receiving, from a service provider device of the service provider, a request to assign a service provider agent to open the lock; communicating with the service provider device to provide service agent access data that is specific for the service provider agent, to allow the service provider agent to open the lock; and transmitting the service agent access data to a service provider agent device associated with the service provider agent.

The step of communicating with the service provider may comprise communicating with the service provider to use a private key of a cryptographic key pair of the service provider device, the private key being used to generate the service agent access data.

The cryptographic key pair may be a cryptographic key pair of the service provider.

The step of communicating with the service provider may comprise commanding the service provider device to provide a first electronic signature of a set of data by using the private key, wherein the service agent access data comprises the set of data and the first electronic signature.

The method may further comprise the step of: generating a second electronic signature using a private key of a cryptographic key pair stored by the access co-ordinator and including the second signature in the service agent access data. In such a case, in the step of transmitting the service agent access data, the service agent access data comprises the second electronic signature.

The approval signal may comprise a first access delegation, from the service consumer to the service provider, and the service agent access data may comprises a second access delegation, from the service provider to the service provider agent.

According to a second aspect, it is provided an access coordinator for providing access to a physical space, secured by a lock, for provision of a service. The lock is associated with a service consumer. The access coordinator comprises: a processor; and a memory storing instructions that, when executed by the processor, cause the access coordinator to: receive an approval signal from a service consumer device of the service consumer, the approval signal indicating that the service consumer allows a service provider agent of a service provider to open the lock; receive, from a service provider device of the service provider, a request to assign a service provider agent to open the lock; communicate with the service provider device to provide service agent access data that is specific for the service provider agent, to allow the service provider agent to open the lock; and transmit the service agent access data to a service provider agent device associated with the service provider agent.

The instructions to communicate with the service provider may comprise instructions that, when executed by the processor, cause the access coordinator to communicate with the service provider to use a private key of a cryptographic key pair of the service provider device, the private key being used to generate the service agent access data.

The cryptographic key pair may be a cryptographic key pair of the service provider.

The instructions to communicate with the service provider may comprise instructions that, when executed by the processor, cause the access coordinator to command the service provider device to provide a first electronic signature of a set of data by using the private key. In such a case, the service agent access data comprises the set of data and the first electronic signature.

The access coordinator may further comprise instructions that, when executed by the processor, cause the access coordinator to: generate a second electronic signature using a private key of a cryptographic key pair stored by the access co-ordinator and including the second signature in the service agent access data. In such a case, the instructions to transmit the service agent access data comprise instructions that, when executed by the processor, cause the access coordinator to include the second electronic signature in the service agent access data.

The approval signal may comprise a first access delegation, from the service consumer to the service provider, and the service agent access data may comprise a second access delegation, from the service provider to the service provider agent.

According to a third aspect, it is provided a computer program for providing access to a physical space, secured by a lock, for provision of a service. The lock is associated with a service consumer. The computer program comprises computer program code which, when run on an access coordinator causes the access coordinator to: receive an approval signal from a service consumer device of the service consumer, the approval signal indicating that the service consumer allows a service provider agent of a service provider to open the lock; receive, from a service provider device of the service provider, a request to assign a service provider agent to open the lock; communicate with the service provider device to provide service agent access data that is specific for the service provider agent, to allow the service provider agent to open the lock; and transmit the service agent access data to a service provider agent device associated with the service provider agent.

According to a fourth aspect, it is provided a computer program product comprising a computer program according to claim the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the access co-ordinator relying on a cryptographic key pair stored by the service provider to delegate an access from the service provider to a service provider agent. By not storing the cryptographic key pair in the access co-ordinator, even if the access co-ordinator were to be attacked and hacked, the attacker would not be able to re-delegate any access rights to thereby gain access.

Figure 1:
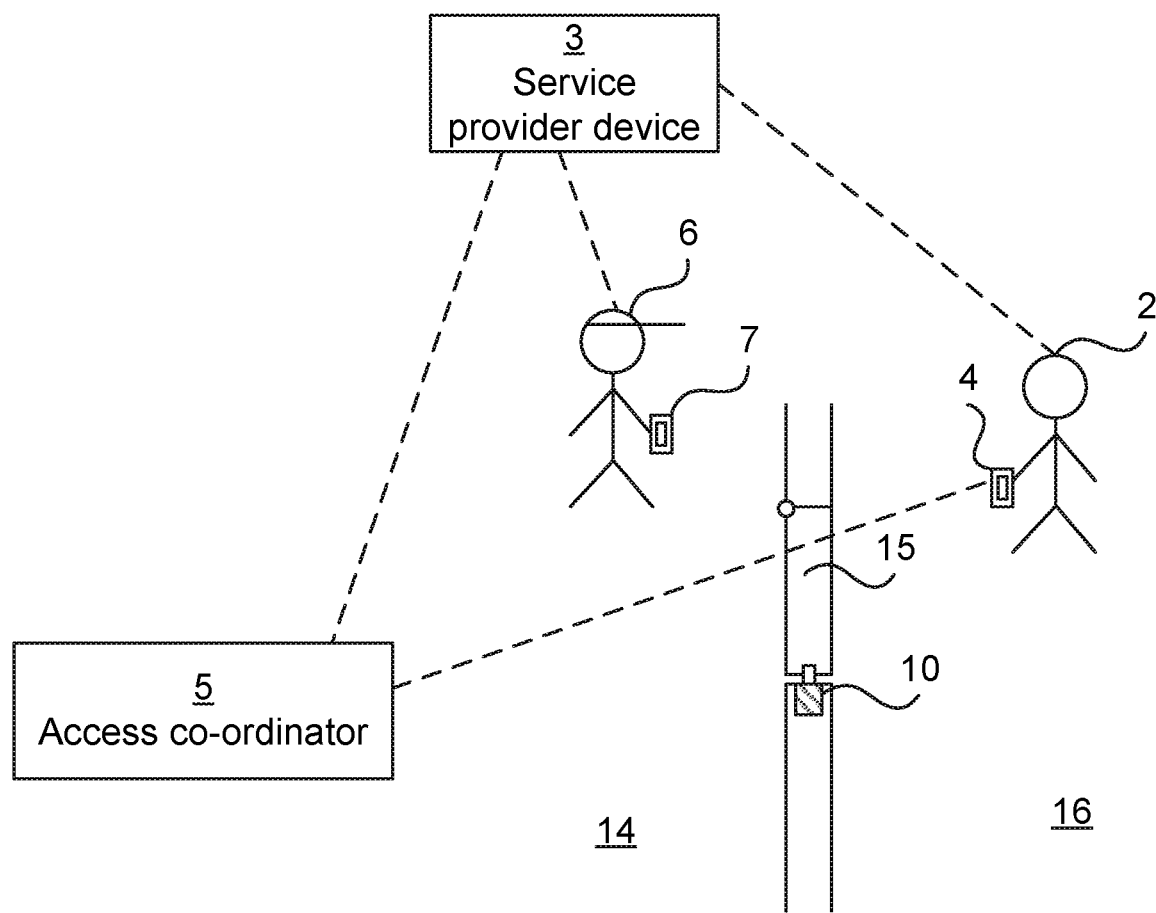
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The barrier 15 can be a door, gate, hatch, cabinet door, drawer, window, etc. The physical barrier 15 is provided in a surrounding physical structure (being a wall, fence, ceiling, floor, etc.) and stands between the restricted physical space 16 and an accessible physical space 14. Note that the accessible physical space 14 can be a restricted physical space in itself, but in relation to this physical barrier 15, the accessible physical space 14 is accessible. In order to control the locked or unlocked state of the barrier 15, a lock 10 is provided.

The owner or user of the lock 10 is here denoted a service consumer 2. The service consumer 2 carries a service consumer device 4, which is a portable electronic device, e.g. a smartphone, mobile phone, tablet computer, laptop computer, etc.

The lock 10 is an electronic lock which is capable of communication with the service consumer device 4. The service consumer device 4 can in turn, but does not need to, be connected or connectable to a plurality of similar locks. The service consumer device 4 can configure the lock 10, e.g. by adding and/or removing credentials which should be allowed to have access. This can be configured directly in the lock 10, or by delegating a right to access the lock from a credential in the service consumer device.

The lock 10 is an electronic lock and can be opened using a credential which is not mechanical. For instance, the credential can be an electronic key, and may be implemented as part of a mobile phone, a smartphone, a key fob, wearable device, smart phone case, access card, electronic physical key, etc. The electronic key can communicate with the lock 10 over a wired or wireless interface, e.g. using Bluetooth, Bluetooth Low Energy (BLE), any of the IEEE 802.15 standards, Radio Frequency Identification (RFID), Near Field Communication (NFC).

There is also a service provider device 3, controlled by a service provider. The service provider can e.g. be a delivery company, a cleaning company, a home care company, a building company, a plumber, an electrician, etc.

As explained in more detail below, the service consumer 2 orders a service from the service provider controlling the service provider device 3.

The service provider uses a service provider agent 6 to conduct the service. The service provider agent 6 is a physical person and can be an employee or a sub-contractor of the service provider. The service provider agent 6 carries a service provider agent device 7, which is a portable electronic device, e.g. a smartphone, mobile phone tablet computer, laptop computer, etc. The functions described herein as being performed by the service provider agent device 7, can e.g. be performed in a software application (also known as app) executing on the service provider agent device 7. The service provider agent device 7, as explained in more detail below, receives service agent access data. The service agent access data is provided to the lock 10 to open the lock.

An access co-ordinator 5 is a server which co-ordinates communication between the different parties involved in this scenario of providing a service which needs access to the restricted physical space 16. The access co-ordinator 5 can be implemented as a server capable of performing the functions described herein.

Communication between the different nodes in FIG. 1 can occur using local communication, e.g. using Bluetooth, Bluetooth Low Energy (BLE), any of the IEEE 802.15 standards, any of the IEEE 802.11 standards, wireless USB (Universal Serial Bus), USB, Ethernet, serial connection (e.g. RS-485), etc. and/or over wide area communication such as cellular networks and the Internet. On a higher layer, Internet Protocol (IP) could be used for the communication.

Figure 2:
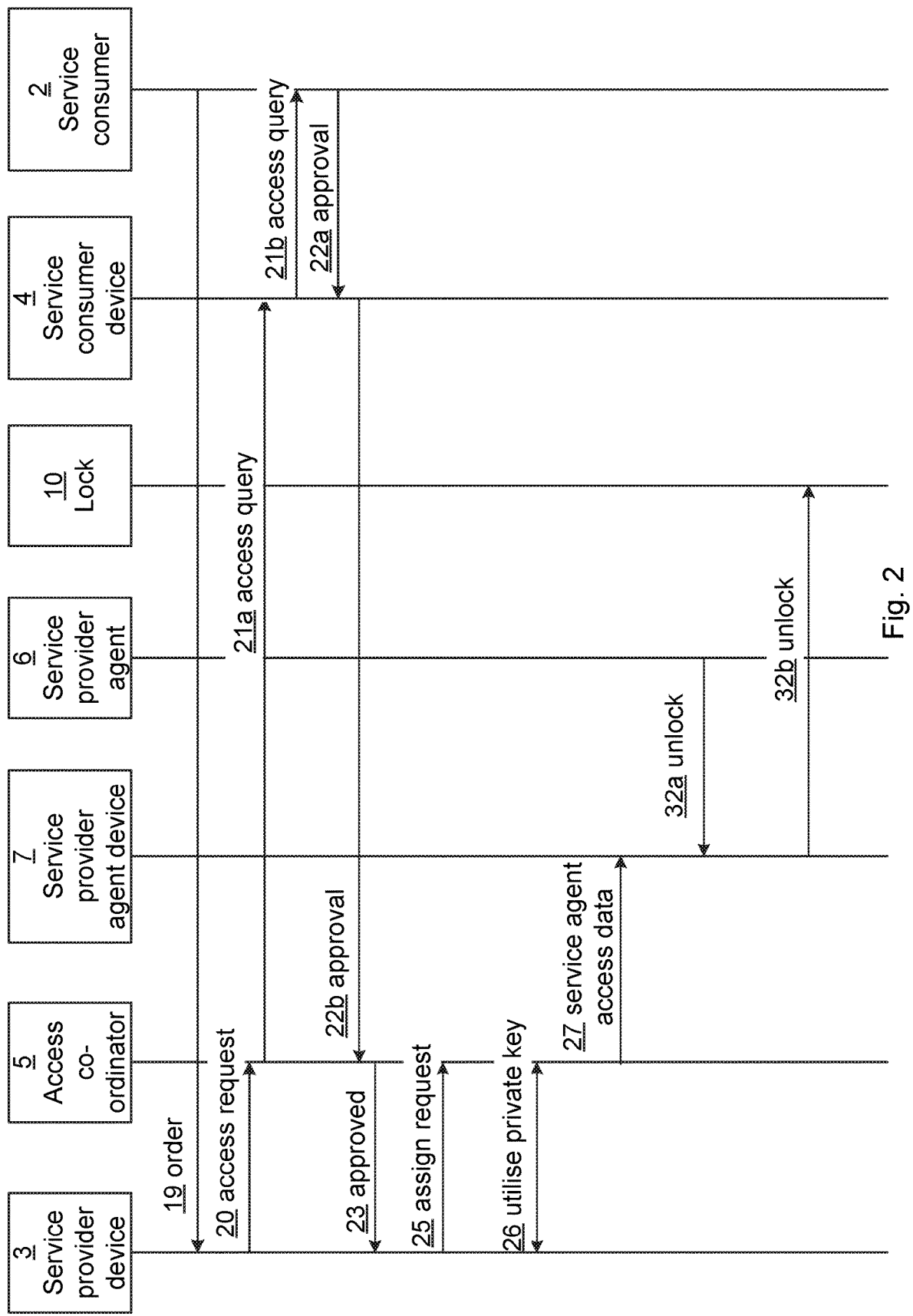
FIG. 2 is a sequence diagram illustrating communication in an example for providing access for a service delivery in the environment of FIG. 1.

FIG. 2 is a sequence diagram illustrating communication in an example for providing a service in the environment of FIG. 1.

First, the service consumer 2 sends an order 19 for a service to a service provider, having access to the service provider device 3. The order 19 can be an order over an electronic service, such as the Internet, over telephone, in person, etc. When the order 19 is not electronic, a person of the service provider enters data of the order using the service provider device 3. It is to be noted that the order 19 can be an indirect order from the service consumer 2 via a third party and does not need to be directly from the service consumer 2 to the service provider. For instance, in an e-commerce example, the service consumer 2 orders a physical product to be delivered from a vendor (being a third party not shown in FIG. 2). The vendor, in turn, makes use of a delivery company for delivery of the physical product to the service consumer 2. The selection of delivery company can be performed by the service consumer or the vendor. In this case, the service consumer 2 indirectly orders a delivery service from the delivery company, in which case the delivery company is the service provider.

The service provider device 3 sends an access request 20 to the access co-ordinator 5. The interface between the service provider device 3 and the access co-ordinator 5 can e.g. be a web interface, based on HTTP (Hypertext Transfer Protocol). In such a case, the access co-ordinator 5 comprises a web server and the service provider device 3 comprises a web client. The access request 20 indicates that the service provider requests access for one of its agents (unspecified at this stage) to open the lock 10 of the service consumer 2. The access request 20 comprises an identifier (e.g. e-mail address or phone number) of the service consumer 2 (or his/her lock 10) and optionally a proposed time or schedule for providing the service of the order 19. The access co-ordinator 5 sends an access query 21a to the service consumer device 4, querying whether the service provider is approved access to the lock, optionally at a specified time. This access query 21a can comprise a public key associated with the service provider. The key pair containing the public key associated with the service provider is stored such that it is accessible for the service provider device 3. However, there is a separate key pair for each service provider.

The service consumer device 4 then asks the service consumer 2, in a corresponding access query 21b, whether the service provider should be approved access using the lock 10, optionally also including a suggested time or time window. This can e.g. be provided as a query in a software application (also known as app) of the service consumer device 4.

The service consumer 2 approves the request (otherwise the sequence ends) in an approval 22a. The service consumer device 4 can at this stage generate an electronic delegation of access right for the lock 10 to the service provider. The service consumer device 4 sends an approval 22b to the access co-ordinator 5, wherein the approval 22b comprises the electronic delegation from the service consumer to the service provider. The delegation can be based on the public key associated with the service provider device received in the access query 21a. In this way, the service consumer device ensures that only the private key of a key pair for the service provider can further delegate the access right (to a service provider agent device) at a later stage. Since there is a separate key pair for each service provider, the service consumer can trust that only agents of the service provider are given access.

The delegation is later verified at the lock by ensuring there is a valid sequence of delegations from the service consumer to the service provider agent device. Each delegation is a delegation of access from a delegator to a delegatee and is provided electronically in a signal to the delegatee. Each delegation also includes any preceding delegations of the sequence. The delegation is signed using an electronic signature by the delegator.

In the example here, the sequence of delegations comprises a first delegation from the service consumer to a service provider, and a second delegation from the service provider to the service provider agent device. In this way, when the service provider agent device provides both delegations to the lock, the lock can verify that there is a valid sequence of delegations from the service consumer to the service provider agent device, by ensuring that the sequence is valid, that the delegator of the first delegation is the service consumer and that the delegatee of the last (second in this case) delegation is the service provider agent device. The lock also verifies that the first delegation is electronically signed by the service consumer device and that the second delegation is electronically signed by the delegatee of the first delegation, i.e. by the service provider device.

Once the access co-ordinator 5 has received the approval signal 22b, the access co-ordinator 5 stores the access delegation forming part of the approval signal 22b.

The access co-ordinator 5 transmits an approved signal to the service provider device 3 of the service provider, indicating that the service consumer 2 has approved access.

At a later stage, which can be a significant amount of time later, when the service provider has allocated an agent (i.e. physical person) to deliver the service to the service consumer, the service provider device 3 transmits an assign request 25 (to assign a service provider agent 6 to open the lock 10) to the access co-ordinator 5, e.g. using the web interface described above.

The access co-ordinator uses 26 a private key accessible to the service provider device to sign a service agent access data, based on the service provider access data. The service agent access data is specific for the particular service provider agent. The service agent access data can be a delegation of the access right from the service provider to the service provider agent, electronically signed by the private key of the key pair for the service provider.

Once generated, the access co-ordinator 5 transmits the service agent access data 27 to the service provider agent device.

When the service provider agent 6 arrives at the site of the lock 10, the service provider agent 6 provides unlock input 32a to the service provider agent device 7 (e.g. using the user interface). The service provider agent device 7 then unlocks 32b the lock 10 using the service provider access data received from the access co-ordinator. Optionally, the service provider agent device 7 only allows the unlocking if the validity time of the service provider access data encompasses the current time.

Figure 3:
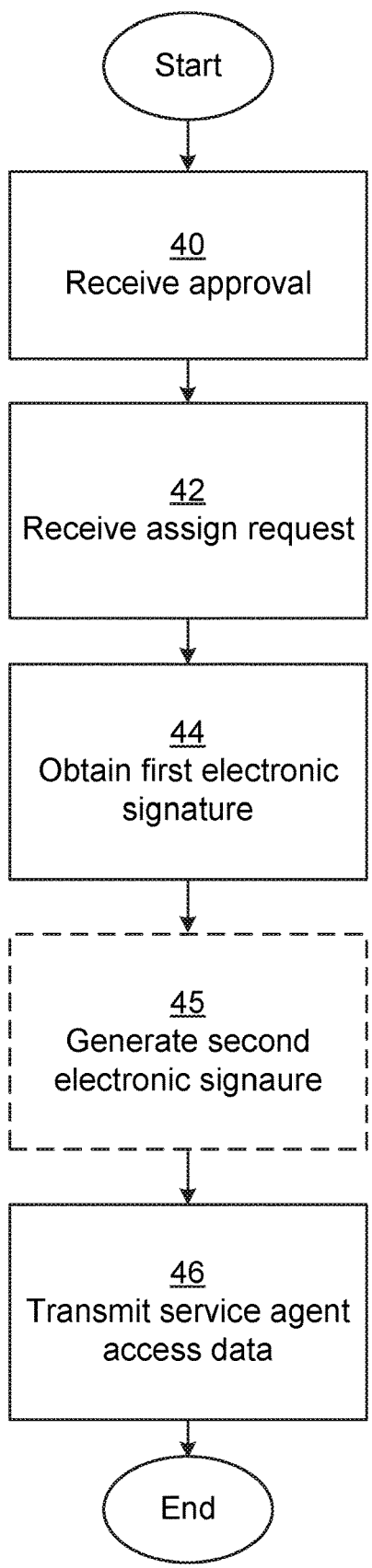
FIG. 3 is a flow chart illustrating embodiments of method for providing access to a physical space for provision of a service.

FIG. 3 is a flow chart illustrating embodiments of method for providing access to physical space secured by a lock for provision of a service. As explained above, the lock is associated with a service consumer. The method is performed in the access co-ordinator and corresponds to the actions of the access coordinator 5 illustrated in FIG. 2 and described above.

In a receive approval step 40, the access co-ordinator receives an approval signal from a service consumer device of the service consumer. The approval signal indicates that the service consumer allows a service provider agent of a service provider to open the lock. The approval signal can contain a delegation of access rights from the service consumer to the service provider, hereinafter denoted a first delegation.

In a receive assign request step 42, the access co-ordinator receives, from the service provider device, a request to assign a service provider agent to open the lock. The assign request comprises an identifier (e.g. e-mail address or phone number) of the service provider agent.

In an obtain first electronic signature step 44, the access co-ordinator communicates with the service provider device. This causes the service provider device to use a private key of a cryptographic key pair of (and thus accessible to) the service provider device. In other words, the key pair is assigned to the service provider and accessible to the service provider device. The cryptographic key pair is specific for the service provider. In one embodiment, the key pair is stored on a smart card accessible to the service provider device. Alternatively or additionally, the key pair is stored in a local file of the service provider device. Alternatively or additionally, the key pair is stored in an external device in local communication with the service provider device. By the service provider device electronically signing the delegation, there is a sequence of delegations from the lock to the service agent via the service provider.

Optionally, this step comprises commanding the service provider device to provide a first electronic signature of a set of data by using the private key. This set of data is then transmitted to the service provider device for electronic signing. The service agent access data comprises here also contains the set of data and the first electronic signature.

In an optional generate second electronic signature step 45, the access co-ordinator generates a second electronic signature using a private key of a cryptographic key pair stored by the access co-ordinator. The second signature is then included in the service agent access data. In such an embodiment, the lock verifies that there is a valid electronic signature by the access co-ordinator in the service agent access data. In this way, a service provider can revoke access for a service provider device, e.g. if it is lost or stolen by informing the access co-ordinator. The access co-ordinator would then never apply its electronic signature for access data associated with the lost or stolen service provider device, thereby enforcing inactivation of the lost or stolen service provider device.

In a transmit service agent access data step 46, the access co-ordinator transmits the service agent access data to a service provider agent device associated with the service provider agent. When step 45, is performed, the service agent access data comprises the second electronic signature.

In order for a valid delegation to occur from the service provider to a service provider agent, both an access delegation from the service consumer to the service provider (i.e. the first delegation) and a private key of a cryptographic key pair are needed. Hence, an attacker would need to get hold both the first delegation and the private key of the service provider in order to be able to further delegate the access right to an arbitrary delegatee. Using this method, the access co-ordinator only stores the first delegation but not the private key of the service provider. Hence, even if an attacker were to gain access to the access delegation, the attacker would not be able to further delegate the access delegation since the attacker would not have access to the private key of the service provider.

Figure 4:
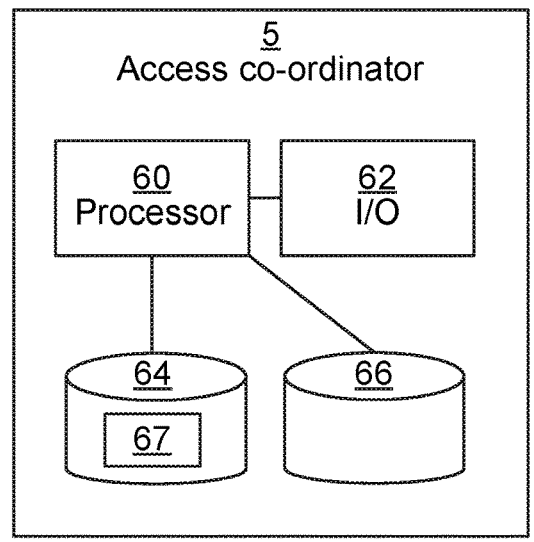
FIG. 4 is a schematic diagram illustrating components of the access coordinator of FIG. 1.

FIG. 4 is a schematic diagram illustrating components of the access co-ordinator 5 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The access co-ordinator 5 further comprises an I/O interface 62 for communicating with external entities. The I/O interface 62 can comprise components for communication over any suitable communication standard, e.g. Ethernet or gigabit Ethernet.

Other components of the access co-ordinator 5 are omitted in order not to obscure the concepts presented herein.

Figure 5:
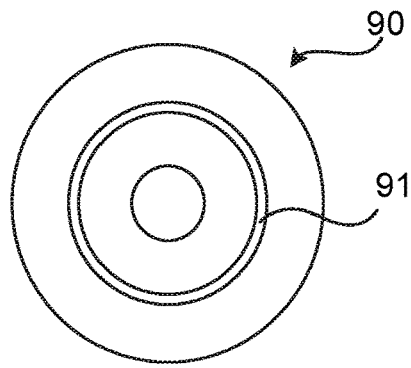
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for providing access to a physical space, secured by a lock, for provision of a service, the lock being associated with a service consumer, the method being performed in an access coordinator and comprising the steps of:
  receiving an approval signal from a service consumer device of the service consumer, the approval signal indicating that the service consumer allows a service provider agent of a service provider to open the lock;
  receiving, from the service provider device, a request to assign a service provider agent to open the lock;
  communicating with the service provider device to use a private key of a cryptographic key pair accessible to the service provider device, the private key being used to generate service agent access data that is specific for the service provider agent, to allow the service provider agent to open the lock; and
  transmitting the service agent access data to a service provider agent device associated with the service provider agent.

ii. The method according to embodiment i, wherein the step of communicating with the service provider comprises commanding the service provider device to provide a first electronic signature of a set of data by using the private key, wherein the service agent access data comprises the set of data and the first electronic signature.

iii. The method according to embodiment i or ii, further comprising the step of:
  generating a second electronic signature using a private key of a cryptographic key pair stored by the access co-ordinator and including the second signature in the service agent access data; and
  wherein in the step of transmitting the service agent access data, the service agent access data comprises the second electronic signature.

iv. The method according to any one of the preceding embodiments, wherein the approval signal comprises a first access delegation, from the service consumer to the service provider, and the service agent access data comprises a second access delegation, from the service provider to the service provider agent.

v. An access coordinator for providing access to a physical space, secured by a lock, for provision of a service, the lock being associated with a service consumer, the access coordinator comprising:
  a processor; and
  a memory storing instructions that, when executed by the processor, cause the access coordinator to:
  receive an approval signal from a service consumer device of the service consumer, the approval signal indicating that the service consumer allows a service provider agent of a service provider to open the lock;
  receive, from the service provider device, a request to assign a service provider agent to open the lock;
  communicate with the service provider device to use a private key of a cryptographic key pair accessible to the service provider device, the private key being used to generate service agent access data that is specific for the service provider agent, to allow the service provider agent to open the lock; and
  transmit the service agent access data to a service provider agent device associated with the service provider agent.

vi. The access coordinator according to embodiment v, wherein the instructions to communicate with the service provider comprise instructions that, when executed by the processor, cause the access coordinator to command the service provider device to provide a first electronic signature of a set of data by using the private key, wherein the service agent access data comprises the set of data and the first electronic signature.

vii. The access coordinator according to embodiment v or vi, further comprising instructions that, when executed by the processor, cause the access coordinator to:
  generate a second electronic signature using a private key of a cryptographic key pair stored by the access co-ordinator and including the second signature in the service agent access data; and
  wherein the instructions to transmit the service agent access data comprise instructions that, when executed by the processor, cause the access coordinator to include the second electronic signature in the service agent access data.

viii. The access coordinator according to any one of embodiments v to vii, wherein the approval signal comprises a first access delegation, from the service consumer to the service provider, and the service agent access data comprises a second access delegation, from the service provider to the service provider agent.

ix. A computer program for providing access to a physical space, secured by a lock, for provision of a service, the lock being associated with a service consumer, the computer program comprising computer program code which, when run on an access coordinator causes the access coordinator to: receive an approval signal from a service consumer device of the service consumer, the approval signal indicating that the service consumer allows a service provider agent of a service provider to open the lock;
  receive, from the service provider device, a request to assign a service provider agent to open the lock;
  communicate with the service provider device to use a private key of a cryptographic key pair accessible to the service provider device, the private key being used to generate service agent access data that is specific for the service provider agent, to allow the service provider agent to open the lock; and
  transmit the service agent access data to a service provider agent device associated with the service provider agent.

x. A computer program product comprising a computer program according to embodiment ix and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for providing access to a physical space, secured by a lock, for provision of a service, the lock being associated with a service consumer, the method being performed in an access coordinator and comprising:
  receiving an approval signal from a service consumer device of the service consumer, the approval signal indicating that the service consumer allows a service provider agent of a service provider to open the lock;
  receiving, from a service provider device of the service provider, a request to assign a service provider agent to open the lock;
  communicating with the service provider device to provide service agent access data that is specific for the service provider agent, to allow the service provider agent to open the lock; and transmitting the service agent access data to a service provider agent device associated with the service provider agent;

wherein the approval signal comprises a first access delegation, from the service consumer to the service provider, and the service agent access data comprises a second access delegation, from the service provider to the service provider agent, wherein the second access delegation includes the first access delegation.

2. The method according to claim 1, wherein communicating with the service provider comprises communicating with the service provider to use a private key of a cryptographic key pair of the service provider device, the private key being used to generate the service agent access data.

3. The method according to claim 2, wherein the cryptographic key pair is a cryptographic key pair of the service provider.

4. The method according to claim 2, wherein communicating with the service provider comprises commanding the service provider device to provide a first electronic signature of a set of data by using the private key, wherein the service agent access data comprises the set of data and the first electronic signature.

5. The method according to claim 2, further comprising:

generating a second electronic signature using a private key of a cryptographic key pair stored by the access co-ordinator and including the second signature in the service agent access data; and wherein transmitting the service agent access data, the service agent access data comprises the second electronic signature.

6. An access coordinator for providing access to a physical space, secured by a lock, for provision of a service, the lock being associated with a service consumer, the access coordinator comprising:

a processor; and a memory storing instructions that, when executed by the processor, cause the access coordinator to:

receive an approval signal from a service consumer device of the service consumer, the approval signal indicating that the service consumer allows a service provider agent of a service provider to open the lock;

receive, from a service provider device of the service provider, a request to assign a service provider agent to open the lock;

communicate with the service provider device to provide service agent access data that is specific for the service provider agent, to allow the service provider agent to open the lock; and transmit the service agent access data to a service provider agent device associated with the service provider agent;

wherein the approval signal comprises a first access delegation, from the service consumer to the service provider, and the service agent access data comprises a second access delegation, from the service provider to the service provider agent, wherein the second access delegation includes the first access delegation.

7. The access coordinator according to claim 6, wherein the instructions to communicate with the service provider comprise instructions that, when executed by the processor, cause the access coordinator to communicate with the service provider to use a private key of a cryptographic key pair of the service provider device, the private key being used to generate the service agent access data.

8. The access coordinator according to claim 7, wherein the cryptographic key pair is a cryptographic key pair of the service provider.

9. The access coordinator according to claim 7, wherein the instructions to communicate with the service provider comprise instructions that, when executed by the processor, cause the access coordinator to command the service provider device to provide a first electronic signature of a set of data by using the private key, wherein the service agent access data comprises the set of data and the first electronic signature.

10. The access coordinator according to claim 7, further comprising instructions that, when executed by the processor, cause the access coordinator to:

generate a second electronic signature using a private key of a cryptographic key pair stored by the access co-ordinator and including the second signature in the service agent access data; and wherein the instructions to transmit the service agent access data comprise instructions that, when executed by the processor, cause the access coordinator to include the second electronic signature in the service agent access data.

11. A non-transitory computer-readable medium comprising a computer program stored thereon configured to provide access to a physical space, secured by a lock, for provision of a service, the lock being associated with a service consumer, the computer program comprising computer program code which, when run on an access coordinator, causes the access coordinator to:

receive an approval signal from a service consumer device of the service consumer, the approval signal indicating that the service consumer allows a service provider agent of a service provider to open the lock;

receive, from a service provider device of the service provider, a request to assign a service provider agent to open the lock;

communicate with the service provider device to provide service agent access data that is specific for the service provider agent, to allow the service provider agent to open the lock; and transmit the service agent access data to a service provider agent device associated with the service provider agent;

wherein the approval signal comprises a first access delegation, from the service consumer to the service provider, and the service agent access data comprises a second access delegation, from the service provider to the service provider agent, wherein the second access delegation includes the first access delegation.

* * * * *